United States Patent
Moriarty et al.

(10) Patent No.: US 9,325,949 B2
(45) Date of Patent: Apr. 26, 2016

(54) INTRUSION DETECTION

(71) Applicant: QUALCOMM Incorporated, San Diego, CA (US)

(72) Inventors: Anthony D. Moriarty, Wollstonecraft (AU); Joel T. Beach, Sydney (AU); Jessica M. Flanagan, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 13/681,216

(22) Filed: Nov. 19, 2012

(65) Prior Publication Data

US 2014/0139678 A1    May 22, 2014

(51) Int. Cl.
*H04N 7/18*       (2006.01)
*G08B 13/196*   (2006.01)
*G07C 9/00*      (2006.01)

(52) U.S. Cl.
CPC .............. *H04N 7/18* (2013.01); *G07C 9/00007* (2013.01); *G08B 13/19671* (2013.01); *G08B 13/19695* (2013.01); *H04N 7/183* (2013.01)

(58) Field of Classification Search
None
See application file for complete search history.

(56) References Cited

U.S. PATENT DOCUMENTS

| 7,466,224 | B2 | 12/2008 | Ward et al. | |
| 7,487,538 | B2 | 2/2009 | Mok | |
| 7,535,353 | B2 | 5/2009 | Hirai et al. | |
| 8,102,238 | B2 | 1/2012 | Golander et al. | |
| 2003/0128099 | A1 | 7/2003 | Cockerham | |
| 2006/0028552 | A1 | 2/2006 | Aggarwal et al. | |
| 2009/0115849 | A1 | 5/2009 | Landers, Jr. et al. | |
| 2010/0253521 | A1* | 10/2010 | Williams et al. | 340/572.1 |
| 2010/0289641 | A1 | 11/2010 | Kates | |
| 2012/0105267 | A1* | 5/2012 | DeLia et al. | 342/22 |
| 2013/0214902 | A1* | 8/2013 | Pineau et al. | 340/5.61 |

FOREIGN PATENT DOCUMENTS

| EP | 1619638 A1 | 1/2006 |
| WO | 2010006298 A1 | 1/2010 |
| WO | 2011019976 A1 | 2/2011 |

OTHER PUBLICATIONS

International Search Report and Written Opinion—PCT/US2013/070749, International Search Authority—European Patent Office, Mar. 14, 2014.
Sebe, et al., "3D Video Surveillance with Augmented Virtual Environments", IWVS'03, Nov. 7, 2003, 6 pgs.

* cited by examiner

*Primary Examiner* — Eileen Adams
(74) *Attorney, Agent, or Firm* — Brian Momeyer

(57) ABSTRACT

Disclosed is an intrusion detector that may be used to determine if a person is authorized or unauthorized based upon the person carrying a token in an area being monitored for security. The intrusion detector may include: an interface and processor. The interface may receive video stream data from a camera and token data. The processor may execute operations including: receiving the video stream data and the token data and determining whether a person in the video stream data is carrying a token based upon whether the token data is associated with the person. If the person is determined to not be carrying a token, the person may be displayed as unauthorized.

37 Claims, 5 Drawing Sheets

INTRUSION DETECTION

BACKGROUND

1. Field

The present invention relates generally to intrusion detection.

2. Relevant Background

Common intrusion detection systems primarily utilize a camera for security purposes and are not very effective in populous environments (e.g., corporate and government buildings/offices/structures/compounds, military installations, airports, hospitals, universities, etc.). This is because there is no way for a security person viewing the display from the camera to differentiate between authorized people and unauthorized people.

Further, security systems that utilize tokens to allow for the entry and exit of authorized people into and out of secure areas, are also ineffective in that there is no way for the display to verify to a security person whether a person actually has a token once they are in the secure area. For example, swipe cards are often used as a token to let people through a door and into a building, however, other people often tail-gate in as well. Once a person is in a building, they may be seen on a display from a camera, but there is no way for a security person viewing them to determine whether or not they have an authorized token.

SUMMARY

Aspects of the invention may relate to an apparatus, method, and system for utilizing an intrusion detector that is used to determine if a person is authorized or unauthorized based upon the person carrying a token in an area being monitored for security. The intrusion detector may include: an interface and processor. The interface may receive video stream data from a camera and token data. The processor may execute operations including: receiving the video stream data and the token data and determining whether a person in the video stream data is carrying a token based upon whether the token data is associated with the person. If the person is determined to not be carrying a token, the person may be displayed as unauthorized.

DETAILED DESCRIPTION

The word "example" or "exemplary" is used herein to mean "serving as an example, instance, or illustration." Any aspect or embodiment described herein as "exemplary" or as an "example" in not necessarily to be construed as preferred or advantageous over other aspects or embodiments.

Figure 1:
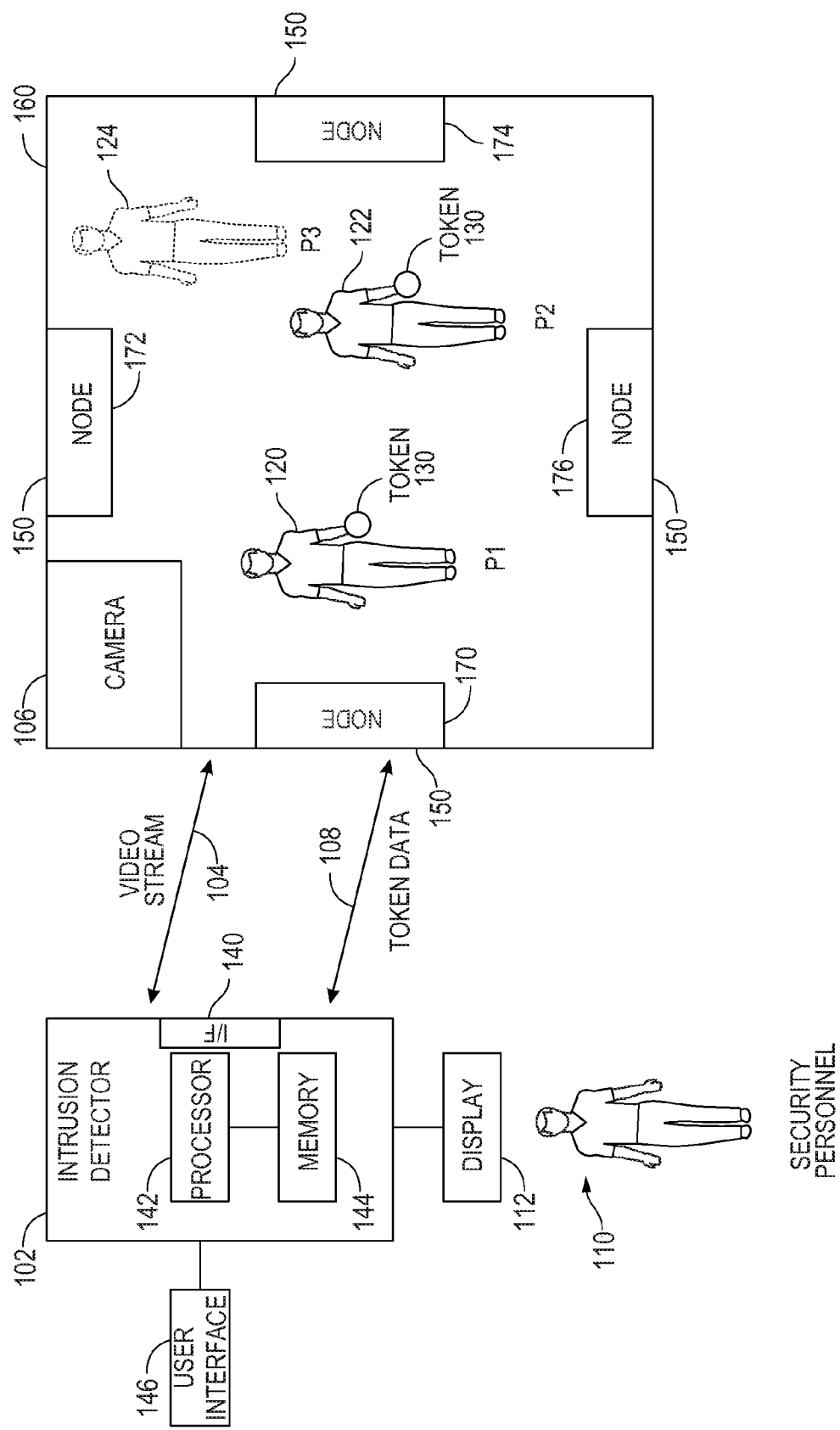
FIG. 1 is a block diagram of a system in which aspects of the invention related to an intrusion detector may be practiced.

With reference to FIG. 1, FIG. 1 is block diagram of a security system in which aspects of the invention may be practiced. As will be described, aspects of the invention relate to an intrusion detector 102 that receives video stream data 104 from a camera 106, in combination with token data 108 from a node 150, such that a security person 110 viewing the video stream data 104 on a display device 112 can determine whether a person (e.g., P1 120, P2 122, and P3 124), is carrying a token 130. If a person is not carrying a token 130, the person can be identified as unauthorized and the security person 110 can take appropriate action.

In one aspect, intrusion detector 102 may include: an interface (I/F) 140; a processor 142; a memory 144; a user interface 146; and the display device 112. I/F 140 may be configured to receive video stream data 104 from camera 106 and token data 108 from node(s) 150. Processor 142 may be configured to execute operations including: receiving video stream data 104 and token data 108; and determining whether a person (e.g., 120, 122, and 124) in the video stream data 104 is carrying a token 130 based upon whether token data 108 is associated with the person. If the person is determined to not be carrying a token 130, then the person may be identified as being unauthorized to the security person 110. For example, display device 112 may display the person as being unauthorized to security person 110 in the video feed. As an example, the person may be designated on the display device 112 in dashed lines (e.g., person 124) or by a certain color (e.g., red for unauthorized; green for authorized, etc.).

On the other hand, if processor 142 of intrusion detector 102 determines that the person (e.g., person 120, 122) is carrying a token 130, then the person may be displayed as being authorized on the display device 112 to security person 110. For example, the person 120, 122 may be shown in full lines and/or colored green, etc. It should be apparent to those of skill in the art that there are many different types of display methods that may be utilized.

Further, it should be appreciated that intrusion detector 102 may be any type of suitable computing device (e.g., specialized security computer system, personal computer, server computer, laptop computer, mobile device, non-mobile device, wireless device, smart phone, cell phone, tablet, personal digital assistant (PDA), etc.) having a processor 142 and memory 144 to implement the previously described functionality. User interface 146 may be any suitable type of input mechanism, e.g., keyboard, keypad, touch-screen, voice recognition microphone, etc. Further, I/F 140 may be a suitable wired or wireless interface. When implemented as a wireless interface, I/F 140 may include suitable transceiver components (e.g., a wireless transmitter and receiver) to send and receive data.

In one particular aspect, a node 150 may be used to generate token data 108 that is transmitted to intrusion detector 102. The token data 108 may be based upon an identification signal received from the token 130, as well as, position data that is calculated to estimate the position of the token 130. For example, the token data 108 may include both position data associated with the token 130, as well as, identification data associated with a person (e.g., a token number, a personal ID, etc.). In this way, based upon the position data of the token data 108 and the video stream data 104, intrusion detector 102 can map the position data of the token 108 with the person on the video stream such that, for example, person 120 can be determined and shown to be carrying a token 130 based upon position data associated with the token 130 and the person 120 through the display device 112 to a security person 110.

In one embodiment, the position of the token 130 may be calculated or estimated by the node 150 and the node 150 may transmit this token data 108 (e.g., the token position) to the intrusion detector 102, as will be described. In another embodiment, token 130 may calculate its own position data and transmit this data directly to the intrusion detector 102 or through a node 150 to the intrusion detector 102.

Further, as previously described, based upon this, processor 142 of the intrusion detector 102 may determine if a person is associated with token data 108 or not associated with token data 108. In one embodiment, the intrusion detector 102 may associate a person with a token 130 based upon the actual position of the token 130 as determined by a node 150. The intrusion detector 102 may display a person 120 on the display device 112 based upon the video stream 104 from the camera 106 in combination with token data 108 (e.g., the position data of the token 130) such that if a person has no token data associated with them (e.g., no position data), the person may be shown on the display device 112 in dashed lines (e.g., person 124) or by a certain color (e.g., red for unauthorized, etc.) to the security person 110.

On the other hand, if processor 142 of intrusion detector 102 associates a person with token data 108 by mapping the position data of the token 130 with person in the video stream 104 such that the person (e.g., person 120, 122) is determined and displayed as carrying a token 130, then the person may be displayed as being authorized on the display device 112 to the security person 110. For example, the person 120, 122 may be shown in full lines and/or colored green, etc.). It should be apparent to those of skill in the art that there are many different types of display methods that may be utilized.

Also, it should be appreciated that a person "carrying" a token merely refers to a person having a token in their presence (e.g., in a pocket, being held, on a wristband, on a necklace, etc.).

As an example, as shown in FIG. 1, various nodes 150 may be mounted to walls of a room 160. It should be appreciated that various nodes 150 may be located at a multitude of different locations (walls, ceilings, floors, tables, furniture, other locations, etc.) throughout a building (e.g., halls, rooms, auditoriums, airport, etc.) or outside a building (e.g., parking lot, walkways, etc.). In particular, each of these nodes 150 may have a known position location. Additionally, each node may be powered by a power supply (e.g., an already existing electrical plug).

Figure 2:
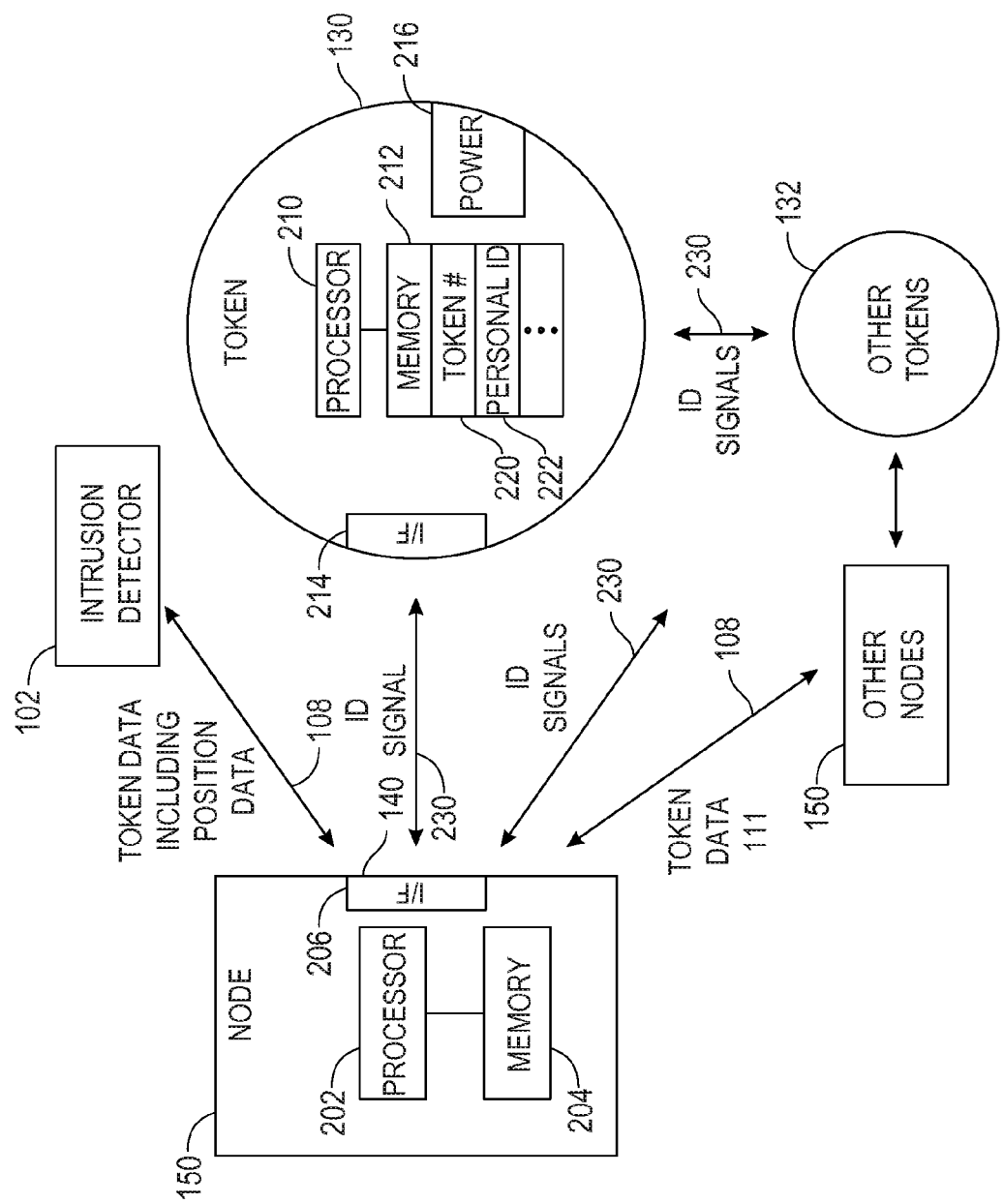
FIG. 2 is a block diagram of the intrusion detector interfacing with a token and a node.

With additional reference to FIG. 2, a block diagram of components of the security system is illustrated. As an example, a node 150 may be a computing device having a processor 202 and a memory 204 to implement various functions including calculating and transmitting token data such as, position data and ID information of tokens 130,132, to the intrusion detector 102. Node 150 may include an I/F 206 (e.g., wireless or wired) to receive ID signals 230 from tokens 130,132 and to transmit token data 108 to intrusion detector 102 and to other nodes. When implemented as a wireless interface, I/F 206 may include suitable transceiver components (e.g., a wireless transmitter and receiver) to send and receive data.

Further, as an example, a token 130 may be a computing device having a processor 210 and a memory 212 to implement various functions. Memory 210 of token 132 may store various identifiers such as: a token number 220; a personal ID 222; as well as various other identifiers. Token 130 may include an I/F 214 (e.g., wireless or wired—but typically wireless) to transmit and receive ID signals 230 to and from other tokens 132 and nodes 150. When implemented as a wireless interface, I/F 214 may include suitable transceiver components (e.g., a wireless transmitter and receiver) to send and receive data.

Various types of ID signals 230 may be used. For example, an ID signal 230 may merely identify a particular number for a token (e.g., token ID #220) to identify the token 130. However, tokens 132 may also include a personal ID 222 that identifies a particular person that is designated to utilize the token 130. As an example, a person's name, age, height, weight, job title, check-in time, etc., may be a personal ID 222. Further, tokens at predetermined intervals (e.g., every 15 seconds) may transmit out their ID signal 230. A token 130 may include a power source 216, such as a battery, so that it is portably powered. As an example, a token 130 may be a smart wireless device that does not require a lot of computational power such that it is inexpensive, light weight, and very portable.

In one aspect, nodes 150, under the control of a position determining program (e.g., such as, a triangulation program) implemented by processor 202, may calculate the positions of tokens 130, 132 and transmit the position data of the tokens (as token data 108) to the intrusion detector 102. In order to calculate the positions of tokens 130 and 132, nodes 150 may communicate token data 111 with each other to calculate the position of identified tokens 130, 132 in a triangulation methodology. Such token data 111 may include time to receive an ID signal 230 from a particular token 130, 132.

It should be appreciated that the nodes 150 have fixed positions and therefore have predefined positions which may be pre-programmed into each node 150 and each node knows the other nodes 150 positions. Therefore, the nodes 150 may receive ID signals 230 from the tokens 130, 132 and may calculate the position of each token 130, 132 such that all of the positions of the tokens 130, 132 can be determined based upon the known position locations of the nodes 150 and the received ID signals 230 from the tokens 130, 132 based upon a triangulation methodology.

As one example, the nodes 150 may implement a triangulation program to determine the position of a token. Referring back to FIG. 1, node 170 may receive an ID signal from token 130 of person 120 and may calculate the time to receive the ID signal. Further, node 172 may also receive the ID signal and may calculate the time to receive the ID signal from token 130 of person 120 and may communicate this token data to node 170. In particular, based upon the known positions of nodes 170 and 172 and the transmit times of the ID signals from token 130 of person 120 to the nodes 170 and 172, node 170 may estimate the position of token 130 from person 120. Further, additional nodes 174 and 176 may also transmit token data to node 170 and in combination with their known positions can further increase the accuracy of the estimate of the position of token 130 of person 120. Moreover, the position estimates for other tokens 130 for other people (e.g., person 2 122) already made may also be utilized in triangulation techniques for better position estimates by the nodes 150 for other tokens 130. Additionally, tokens 130 may communicate with one another in token to token communication and to the nodes 150 to aid in token position estimation by the nodes 150 via triangulation methods. Furthermore, tokens 130 may estimate their own positions and communicate with one another in token to token communication to aid in token position estimation.

In this way, by tokens 130 (that are moving) communicating with various nodes 150 (having fixed and known positions) that communicate token data (e.g., time to receive an ID signal from a particular token) with one another, an ad-hoc mesh network is provided in which by utilizing triangulation techniques the positions of tokens 130 may be estimated by nodes 150 and transmitted as position token data 108 to the intrusion detector 102. It should be appreciated that a wide variety of differing types of position calculation techniques may be implemented by the nodes 150 and that this is just one example. Further, the intrusion detector 102 may also calculate the position estimates of the tokens 130 based upon data from the nodes 150 in addition to the nodes or instead of the nodes. Also, as previously described, in one embodiment, in the case of more complex tokens, the tokens may calculate their own position estimation data. In summary, as previously described, by utilizing triangulation techniques, an ad-hoc mesh network is created in which nodes 150 and tokens 130 communicate with one another such that position data for each token 130 may be accurately estimated.

Also, it should be appreciated that this is just one example of nodes 150 communicating in a room to implement position determination techniques and that these techniques may be implemented by nodes at a variety of different locations (walls, ceilings, floors, tables, furniture, other locations, etc.) throughout a building (e.g., halls, rooms, auditoriums, airport, etc.) or outside a building (e.g., parking lot, walkways, etc.).

Figure 3:
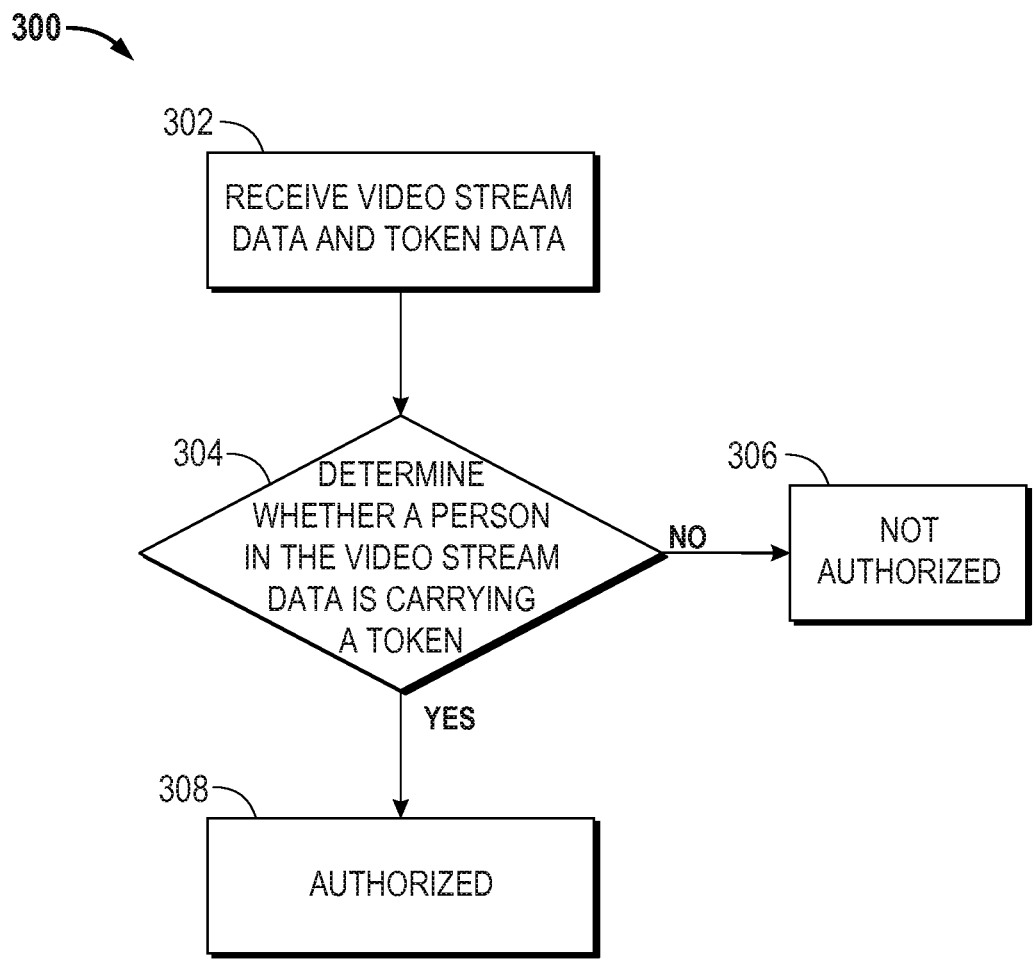
FIG. 3 is a flow diagram illustrating a process implemented by the intrusion detector to determine whether a person is authorized or unauthorized.

With brief additional reference to FIG. 3, FIG. 3 shows a flow diagram illustrating a process 300 to determine whether a person is authorized or not authorized based upon the use of tokens. At block 302, intrusion detector 102 may receive video stream data 104 and token data 108 from nodes 150. At decision block 304, intrusion detector 102 may determine whether a person (120, 122, 124) in the video stream data 104 is carrying a token 130 based upon whether token position data is associated with a person. For example, if the person is determined to not be carrying a token 130 based upon the token position data, then the person may be identified as being unauthorized to the security person 110 (block 306). For example, display device 112 may display the person as being unauthorized to security person 110 in the video feed. As an example, the person may be designated on the display device 112 in dashed lines (e.g., person 124) or by a certain color (e.g., red for unauthorized).

On the other hand, if at decision block 304, the intrusion detector 102 determines that the person 120,122 is carrying a token 130, then the person is displayed as being authorized on display device 112 to the security person 110 (block 308). For example, the person 120,122 may be shown in full lines and/or colored green, etc.

In addition to the use of token data 108 (e.g., position token data), the intrusion detector 102 may also utilize biometric data to determine whether persons or authorized or not authorized.

In an additional aspect, if a person 120 is determined to be carrying a token 130 by the by the position data of the token 130 being associated with the person 120 of the video stream 104 by processor 142 of intrusion detector 102, then intrusion detector 102 may further execute operations including comparing measured biometric data of the person 120 carrying the token to stored biometric data for the person assigned to the token. As an example, memory 144 of the intrusion detector 102 may store biometric data for authorized persons.

If the measured biometric data of the person 120 carrying the token 130 matches the stored biometric data for the person 120 assigned to the token, the person 120 may be identified as authorized and the authorized person may be displayed on the display device 112 to a security person 110 as authorized, as previously described.

However, as will be described, if the measured biometric data of the person carrying the token does not match the stored biometric data for the person assigned to the token, the person may be identified as unauthorized and the unauthorized person may be displayed on the display device to a security person as unauthorized. The biometric data may include facial recognition, height, weight, voice, etc. It should be appreciated that a wide variety of different types of biometric data may be utilized and that these are only examples.

Biometric data may be determined by known methodologies by intrusion detector 102 under the control of processor 142 to utilize the video stream data 104, along with other data (e.g., sound data) transmitted to the intrusion detector 102 by other sources, to determine biometric data related to facial recognition, height, weight, voice, etc. This biometric data utilized in combination with token data provides additional security in determining authorized and unauthorized persons. Examples of this will be hereinafter described.

Figure 4:
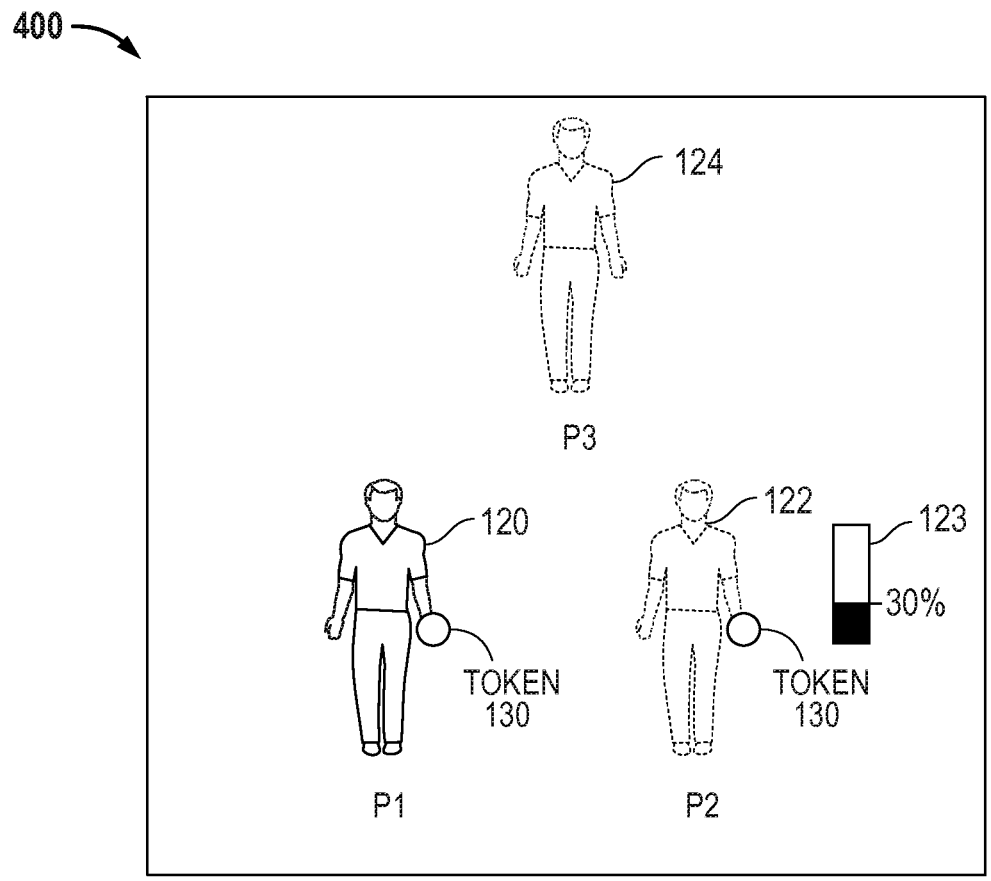
FIG. 4 is a diagram illustrating an example of a display of authorized and unauthorized people.

With additional reference to FIGS. 4 and 5, examples of the intrusion detector 102 determining whether persons in the video stream 104 should be identified as authorized or not authorized based upon token data 108 and biometric data will be described. As an example, as shown in FIG. 4, person (P1) 120 may have a token 130. Person 120 may be shown on display screen 400 of display device 112 to a security person 110. As previously described, person 120 may be displayed to have a token 130 based upon the determined position data of the token 130 being associated with person 120 by the intrusion detector 102 such that the token 130 is displayed with person 120 on the display screen 400. Further, biometric data may also be utilized.

As an example, the intrusion detector 102 based upon facial recognition, height, and weight as calculated from the video stream 104 may compare this to previously stored biometric data for the person assigned to the token 130 with respect to facial recognition, height, and weight. Thus, it may be determined whether the person 120 has substantially the same face, same height, same weight, etc., as stored for the assigned person. In particular, if the biometric data for the person assigned to the token 130 matches, then person 120 is displayed as authorized.

Figure 5:
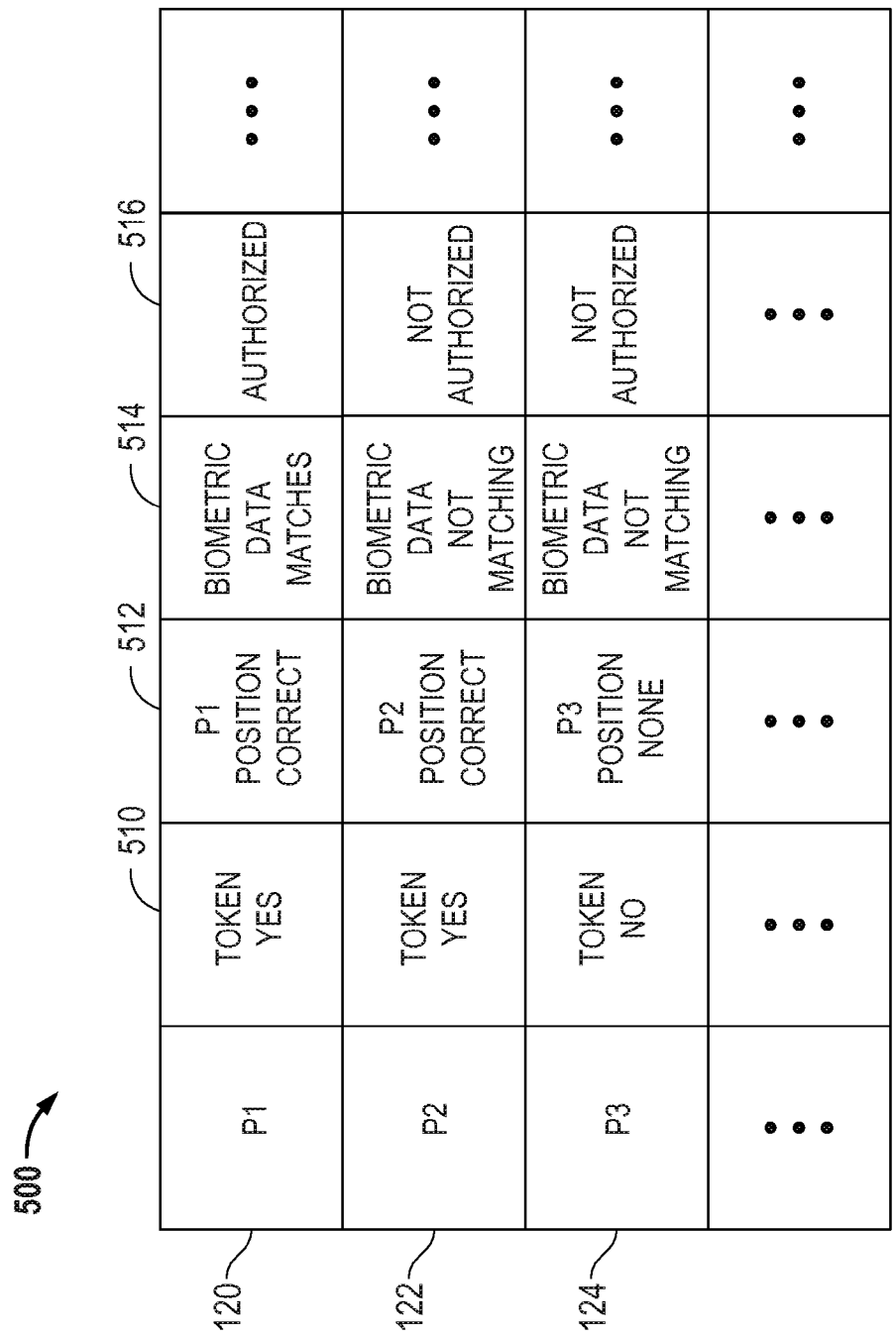
FIG. 5 is a diagram of a table providing examples of data utilized to determine if a person is authorized or unauthorized.

For example, with brief additional reference to FIG. 5, which is a table 500 showing collected data by the intrusion detector, table 500 may include person P1 120 having: a token identifier 510 set to "yes"; position identifier 512 set to "correct" indicating that the token is associated with the correct position data for the person P1 120; and biometric data 514 set to "matches" indicating matching biometric data—such that intrusion detector 102 identifies the person 120 as authorized 516. For example, the person 120 may be shown in full lines and/or colored green, etc., on the display screen 400.

As another example, as shown in FIG. 4, person (P2) 122 may have a token 130. Person 122 may be shown on display screen 400 of the display device 112 to a security person 110. As previously described, person 122 may be displayed to have a token 130 based upon the determined position data of the token 130 being associated with person 122 by the intrusion detector 102 such that the token 130 is displayed with person 122 on the display screen 400. Further, biometric data may also be utilized.

As an example, the intrusion detector 102 based upon facial recognition, height, and weight biometric data as calculated from the video stream 104 may compare this to previously stored biometric data for the person assigned to the token 130 with respect to facial recognition, height, and weight. Thus, intrusion detector 102 may determine whether person 122 has substantially the same face, same height, same weight, etc., as stored for the assigned person. In particular, if the biometric data for the person assigned to the token 130 does not match (e.g., the person has a different face, height, weight, etc.), then person 122 may be displayed as not authorized.

For example, with brief reference to FIG. 5, which is a table 500 showing collected data by the intrusion detector, table 500 may include person P2 122 having: a token identifier 510 set to "yes"; position identifier 512 set to "correct" indicating that the token is associated with the correct position data for the person P2 122; and biometric data 514 set to "not matching" indicating biometric data that does not match—such that intrusion detector 102 identifies the person 120 as not authorized 516. For example, the person 122 may be shown in dashed lines and/or by a certain color (e.g., red for unauthorized) on the display screen 400. In this example, there is a high probability that an unauthorized person has the token 130.

In addition, a level of confidence may be utilized (e.g., fuzzy authorization). In this example, person P2 has a token 130, but the biometric data 514 measured is indicative of not matching the authorized person that the token 130 is supposed to be carried by. In particular, as an example, P2's face may not be recognizable by the system and P2's height and weight may be off by 15% in comparison to the values stored for the authorized person. In this instance, there is a high probability that the person is unauthorized—but this determination cannot be made for certain. Therefore, a level of confidence as to whether the person is authorized is assigned and may be shown by a bar next to the person on the display screen 400. As an example, a bar 123 may be displayed next to the person (P2) indicating the level of confidence. In this example, the level of confidence is low (e.g., 30%) because there is a high probability based upon the measurable biometric data that the person (P2) is not the person authorized to be carrying the token. It should be appreciated that a wide variety of different types of level of confidence measurements (e.g., based upon biometric data) may be utilized and that a variety of different types of displays may be utilized—and that these example are merely illustrative.

As yet another example, as shown in FIG. 4, person (P3) 124 may not have a token. Person 124 may be shown on display screen 400 of display device 112 to a security person 110 based upon video stream 104. Because person 124 does not have a token, they may be automatically display as unauthorized. For example, person 124 may be shown in dashed lines and/or by a certain color (e.g., red for unauthorized) on the display screen 400.

However, even though the person does not have a token, biometric data may still be utilized to identify the person. For example, the intrusion detector 102 based upon facial recognition, height, and weight as calculated from the video stream 104 may compare this to previously stored biometric for a person that may be authorized. Thus, it may be determined whether the person has substantially the same face, same height, same weight, etc., of an authorized person, or not, in which case they are not authorized. For example, with brief reference to FIG. 5, table 500 may include person P3 124 having: a token identifier 510 set to "no"; position identifier 512 set to "none" indicating that there is no token associated with person 124; biometric data 514 set to "not matching" indicating biometric data that does not match—such that intrusion detector 102 identifies the person 120 as not authorized 516. On the other hand, even though the person does not have a token, the person may be identified as typically authorized if the intrusion detector 102 determines if biometric data for facial recognition, height, and weight calculated from the video stream 104 matches biometric data associated with a stored authorized person.

Further, it should be appreciated that the intrusion detector 102 may still estimate the position of person 124 without a token, based upon the previously described triangulation methodology and based upon the already estimated positions of the tokens 130, persons 122 and 124, and the predefined positions of all the nodes 150.

Therefore, aspects of the invention relate to an intrusion detector 102 that receives video stream data 104 from a camera 106 in combination with token data 108 such that it can be determined by a security person 110 viewing the video stream data on a display device 112 whether a person is carrying a token 103. If a person is not carrying a token, they may automatically be displayed as unauthorized (e.g., in dashed lines and/or colored red, etc.) and the security person 110 can take appropriate action. On the other hand, a person 120 may determined to be authorized by their possession of a token 130 and may be displayed to security personnel 110 as such (e.g., in full lines and/or colored green, etc.).

Examples have been provided in which a token 130 may be smart wireless device which can have its location determined by communicating with nodes 150 in an ad-hoc mesh network. Using object detection methods on the video stream data 104 from a camera 106, all persons can be detected regardless of their possession of tokens 130. It should be appreciated that any suitable camera may be utilized, such as, an infrared (IR) camera, etc.

Additionally, intrusion detector 102 may create a list of people within a space and cross-correlate that with the list of authorized people (e.g., persons 120 and 122 in FIG. 1). Areas in which unauthorized people (e.g., person 124 in FIG. 1) are located may generate an alarm (e.g., sound alarms or visual alarms) to be brought to the attention of security personnel 110. As a previously described example, unauthorized people could be highlighted on the video stream (e.g., in red or dashed lines). Further, as previously described, when biometric data is associated with tokens 130 as implemented by intrusion detector 102, inappropriate or stolen tokens may be automatically identified by checking stored biometric data associated with the token against detected biometric data (e.g., height, weight, or facial recognition) for the person carrying the token. Also, further biometric data streams (e.g., audio, pressure, movement, etc.) from other sources may also be utilized.

Additionally, it should be appreciated that although the display device 112 examples of FIG. 1 and FIG. 4 show 2D examples of displaying persons 120, 122, 124 and described different types of light and solid/dashed presentation techniques, that these are merely simple examples. Any type of display may be utilized: 2D, 3D, computer graphics, cartoon, digital, real-time video with computer graphic techniques, etc.

Further, it should be appreciated that the previously described example of a room 160 in which nodes 150 communicate to implement position determination techniques that are utilized by intrusion detector 102 to identify authorized and unauthorized people to security is just one example. These techniques may be implemented by nodes at a variety of different locations (walls, ceilings, floors, tables, furniture, other locations, etc.) throughout buildings (e.g., halls, rooms, auditoriums, airport, etc.) or outside buildings (e.g., parking lot, walkways, etc.).

An example of the utilization of the previously-described techniques may be in an airport scenario. In the airport scenario, with FIG. 1 as an illustration, a person may approved at a security check-point, at which point they are given a token 130 (e.g., person 120 and 122) to walk through the building 160 to the airplane, at which point they then can hand-back the token upon the boarding of the airplane. Unauthorized people (without tokens 130, e.g., person 124) could be tracked by security personnel 110 on the display device 112 and authorized people 120 and 122, with tokens 130, could be found if needed (e.g., if they are late for their flight).

Aspects of the invention provide advantages in that: authorization is tracked constantly (not just at entry points); biometric data is continuously checked; and human interaction is reduced (e.g., a security guard is only required when a person is shown on the display device as unauthorized and/or an alarm is set off). Further, biometric matching is simplified because particular singular people are matched against a singular set of known data for that particular person. Moreover, an attack by the insertion of a fake video feed (e.g., a replay of earlier footage) cannot be utilized with aspects of the invention because the fake video would not correlate with the detected scene of authorized persons carrying tokens provided by the system.

It should be appreciated that aspects of the invention previously described may be implemented in conjunction with the execution of instructions by processors 142, 202, 210 of intrusion detectors 102, nodes 150, and tokens 130. Particularly, circuitry of the intrusion detectors, nodes, and tokens, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry. Further, it should be appreciated that the terms processor, microprocessor, circuitry, controller, etc., refer to any type of logic or circuitry capable of executing logic, commands, instructions, software, firmware, functionality, etc It should be appreciated that when the intrusion detectors 102, nodes 150, and tokens 130 are mobile or wireless devices that they may communicate via one or more wireless communication links through a wireless network that are based on or otherwise support any suitable wireless communication technology. For example, in some aspects the intrusion detectors, nodes, and tokens and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM™, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a user I/O device, a computer, a server, a point-of-sale device, an entertainment device, a set-top box, or any other suitable device. These devices may have different power and data requirements In some aspects, a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An intrusion detector comprising:
   an interface to receive video stream data from a camera and token data; and
   a processor to execute operations including:
      receiving the video stream data and the token data, the token data comprising position data associated with a token, the position data being calculated using triangulation based on a plurality of nodes with known locations; and
      determining whether a person in the video stream data is carrying the token based upon the position data being associated with the token and with the person;
      wherein, when the person in the video stream data is determined to not be carrying the token associated with the calculated position data, identifying the person in the video stream data as unauthorized.

2. The intrusion detector of claim 1, further comprising a display device, wherein, the unauthorized person is displayed on the display device as unauthorized.

3. The intrusion detector of claim 1, wherein, if the person is determined to be carrying the token, further comprising identifying the person as authorized.

4. The intrusion detector of claim 3, further comprising a display device, wherein, the authorized person is displayed on the display device as authorized.

5. The intrusion detector of claim 1, wherein the token data comprises an identification signal received from the token.

6. The intrusion detector of claim 1, wherein, if the person is determined to be carrying the token, the processor further executes operations including comparing measured biometric data of the person carrying the token to stored biometric data for the person assigned to the token.

7. The intrusion detector of claim 6, wherein, if the measured biometric data of the person carrying the token matches the stored biometric data for the person assigned to the token, the processor further executes operations including identifying the person as authorized.

8. The intrusion detector of claim 7, further comprising a display device, wherein, the authorized person is displayed on the display device as authorized.

9. The intrusion detector of claim 6, wherein, if the measured biometric data of the person carrying the token does not match the stored biometric data for the person assigned to the token, the processor further executes operations including identifying the person as unauthorized.

10. The intrusion detector of claim 9, further comprising a display device, wherein, the unauthorized person is displayed on the display device as unauthorized.

11. The intrusion detector of claim 6, wherein the measured biometric data includes facial recognition.

12. The intrusion detector of claim 7, wherein the measured biometric data includes at least one of height or weight.

13. A method comprising:
   receiving video stream data from a camera and token data, the token data comprising position data associated with a token, the position data being calculated using triangulation based on a plurality of nodes with known locations; and
   determining whether a person in the video stream data is carrying the token based upon the position data being associated with the token and with the person;

wherein, when the person in the video stream data is determined to not be carrying the token associated with the calculated position data, identifying the person in the video stream data as unauthorized.

14. The method of claim 13, further comprising displaying the unauthorized person on a display device as unauthorized.

15. The method of claim 13, wherein, if the person is determined to be carrying the token, further comprising identifying the person as authorized and displaying the authorized person on a display device as authorized.

16. The method of claim 13, wherein the token data comprises an identification signal received from the token.

17. The method of claim 13, wherein, if the person is determined to be carrying the token, further comprising, comparing measured biometric data of the person carrying the token to stored biometric data for the person assigned to the token.

18. The method of claim 17, wherein, if the measured biometric data of the person carrying the token matches the stored biometric data for the person assigned to the token, further comprising identifying the person as authorized and displaying the authorized person on a display device as authorized.

19. The method of claim 17, wherein, if the measured biometric data of the person carrying the token does not match the stored biometric data for the person assigned to the token, further comprising identifying the person as unauthorized and displaying the unauthorized person on a display device as unauthorized.

20. The method of claim 17, wherein the measured biometric data includes at least one of facial recognition, height, or weight.

21. A non-transitory computer-readable medium comprising code which, when executed by a processor of an intrusion detector, causes the processor to perform a method comprising:
receiving video stream data from a camera and token data, the token data comprising position data associated with a token, the position data being calculated using triangulation based on a plurality of nodes with known locations; and
determining whether a person in the video stream data is carrying the token based upon the position data being associated with the token and with the person;
wherein, when the person in the video stream data is determined to not be carrying the token associated with the calculated position data, identifying the person in the video stream data as unauthorized.

22. The non-transitory computer-readable medium of claim 21, further comprising code for displaying the unauthorized person on a display device as unauthorized.

23. The non-transitory computer-readable medium of claim 21, wherein, if the person is determined to be carrying the token, further comprising code for identifying the person as authorized and displaying the authorized person on a display device as authorized.

24. The non-transitory computer-readable medium of claim 21, wherein the token data comprises an identification signal received from the token.

25. The non-transitory computer-readable medium of claim 21, wherein, if the person is determined to be carrying the token, further comprising code for comparing measured biometric data of the person carrying the token to stored biometric data for the person assigned to the token.

26. The non-transitory computer-readable medium of claim 25, wherein, if the measured biometric data of the person carrying the token matches the stored biometric data for the person assigned to the token, further comprising code for identifying the person as authorized and displaying the authorized person on a display device as authorized.

27. The non-transitory computer-readable medium of claim 25, wherein, if the measured biometric data of the person carrying the token does not match the stored biometric data for the person assigned to the token, further comprising code for identifying the person as unauthorized and displaying the unauthorized person on a display device as unauthorized.

28. The non-transitory computer-readable medium of claim 25, wherein the measured biometric data includes facial recognition.

29. The non-transitory computer-readable medium of claim 25, wherein the measured biometric data includes at least one of height or weight.

30. An intrusion detector comprising:
means for receiving video stream data from a camera and token data, the token data comprising position data associated with a token, the position data being calculated using triangulation based on a plurality of nodes with known locations; and
means for determining whether a person in the video stream data is carrying the token based upon the position data being associated with the token and with the person;
wherein, when the person in the video stream data is determined to not be carrying the token associated with the calculated position data, identifying the person in the video stream data as unauthorized.

31. The intrusion detector of claim 30, further comprising means for displaying the unauthorized person as unauthorized.

32. The intrusion detector of claim 30, wherein, if the person is determined to be carrying the token, further comprising means for identifying the person as authorized and displaying the authorized person as authorized.

33. The intrusion detector of claim 30, wherein the token data comprises an identification signal received from the token.

34. The intrusion detector of claim 30, wherein, if the person is determined to be carrying the token, further comprising means for comparing measured biometric data of the person carrying the token to stored biometric data for the person assigned to the token.

35. The intrusion detector of claim 34, wherein, if the measured biometric data of the person carrying the token matches the stored biometric data for the person assigned to the token, further comprising means for identifying the person as authorized and displaying the authorized person as authorized.

36. The intrusion detector of claim 34, wherein, if the measured biometric data of the person carrying the token does not match the stored biometric data for the person assigned to the token, further comprising means for identifying the person as unauthorized and displaying the unauthorized person as unauthorized.

37. The intrusion detector of claim 34, wherein the measured biometric data includes at least one of facial recognition, height, or weight.

* * * * *